(12) United States Patent
Scheffler et al.

(10) Patent No.: US 9,734,174 B1
(45) Date of Patent: Aug. 15, 2017

(54) INTERACTIVE MANAGEMENT OF DISTRIBUTED OBJECTS

(71) Applicant: GOOGLE INC., Mountain View, CA (US)

(72) Inventors: Jens Scheffler, San Jose, CA (US); Kapil Mehrotra, Fremont, CA (US); Jeff Scott Schumacher, San Jose, CA (US); Kathrin Probst, Atlanta, GA (US)

(73) Assignee: GOOGLE INC., Mountain View, CA (US)

( * ) Notice: Subject to any disclaimer, the term of this patent is extended or adjusted under 35 U.S.C. 154(b) by 234 days.

(21) Appl. No.: 13/931,726

(22) Filed: Jun. 28, 2013

(51) Int. Cl.
   *G06F 17/30* (2006.01)
(52) U.S. Cl.
   CPC ............... *G06F 17/30312* (2013.01)
(58) Field of Classification Search
   CPC ........... G06F 17/3071; G06F 17/30265; G06F 3/0236; G06F 2203/0381; G06F 3/0482
   USPC ........... 707/600–831, 899, 999.001–999.206
   See application file for complete search history.

(56) References Cited

U.S. PATENT DOCUMENTS

| | | |
|---|---|---|
| 6,208,975 B1 | 3/2001 | Bull et al. |
| 6,269,343 B1 | 7/2001 | Pallakoff |
| 7,120,629 B1 | 10/2006 | Seibel et al. |
| 7,640,183 B1 | 12/2009 | Burns |
| 7,739,149 B2 | 6/2010 | Freishtat et al. |
| 7,774,715 B1 | 8/2010 | Evans |
| 7,805,330 B2 | 9/2010 | Johnson et al. |
| 8,090,355 B2 | 1/2012 | Rissanen |
| 8,478,651 B1 | 7/2013 | Crafts et al. |

(Continued)

FOREIGN PATENT DOCUMENTS

| | | |
|---|---|---|
| JP | 2009-075839 | 4/2009 |
| KR | 10-2008-0044955 | 5/2008 |

(Continued)

OTHER PUBLICATIONS

Goldman, M. Office Action issued in co-pending U.S. Appl. No. 11/839,353, filed Aug. 15, 2007, pp. 1-13, Sep. 27, 2013.

(Continued)

*Primary Examiner* — Angelica Ruiz
(74) *Attorney, Agent, or Firm* — Johnson, Marcou & Isaacs, LLC

(57) ABSTRACT

A digital object provider creates an object, such as an offer, and associates container-specific handlers with the object so that the object can be associated with a specific container. An object management application manages receives and displays the object on a user computing device, along with a first user control option to associate the object with a container. When the user selects the first option, the object management application relies on the associated container-specific handlers to determine which containers are available for associating the object. The object management application provides the user with a second control option, from which the user selects one or more of the available containers with which to associate the object. Based on the user's selection, the object management application communicates the object to the selected containers, such as for storage in the container. The container receives the object and associates the object with the container.

20 Claims, 6 Drawing Sheets

(56) References Cited

U.S. PATENT DOCUMENTS

| | | | |
|---|---|---|---|
| 2002/0160761 A1* | 10/2002 | Wolfe | H04M 3/493 455/414.1 |
| 2003/0233276 A1 | 12/2003 | Pearlman et al. | |
| 2004/0059708 A1 | 3/2004 | Dean et al. | |
| 2005/0033641 A1 | 2/2005 | Jha et al. | |
| 2005/0045728 A1 | 3/2005 | Kargman | |
| 2005/0091576 A1* | 4/2005 | Relyea et al. | 715/502 |
| 2005/0160014 A1 | 7/2005 | Moss et al. | |
| 2005/0177716 A1* | 8/2005 | Ginter et al. | 713/157 |
| 2005/0189415 A1 | 9/2005 | Fano et al. | |
| 2005/0209921 A1 | 9/2005 | Roberts et al. | |
| 2005/0245241 A1 | 11/2005 | Durand et al. | |
| 2006/0015405 A1 | 1/2006 | Bala et al. | |
| 2006/0072724 A1 | 4/2006 | Cohen et al. | |
| 2006/0090185 A1 | 4/2006 | Zito et al. | |
| 2006/0212350 A1 | 9/2006 | Ellis et al. | |
| 2006/0224447 A1 | 10/2006 | Koningstein | |
| 2007/0027772 A1 | 2/2007 | Chou et al. | |
| 2007/0073592 A1 | 3/2007 | Perry et al. | |
| 2007/0094075 A1 | 4/2007 | Graham et al. | |
| 2007/0100802 A1 | 5/2007 | Celik | |
| 2007/0112757 A1 | 5/2007 | Bates et al. | |
| 2007/0150345 A1 | 6/2007 | Tonse et al. | |
| 2007/0156519 A1 | 7/2007 | Agassi et al. | |
| 2007/0162328 A1 | 7/2007 | Reich | |
| 2007/0168282 A1 | 7/2007 | Giordano | |
| 2007/0239542 A1 | 10/2007 | Shapiro | |
| 2007/0271145 A1 | 11/2007 | Vest | |
| 2008/0046313 A1 | 2/2008 | Chen | |
| 2008/0065602 A1 | 3/2008 | Cragun et al. | |
| 2008/0077486 A1 | 3/2008 | Davis et al. | |
| 2008/0082416 A1 | 4/2008 | Kotas et al. | |
| 2008/0086368 A1 | 4/2008 | Bauman et al. | |
| 2008/0133366 A1 | 6/2008 | Evans et al. | |
| 2008/0140508 A1 | 6/2008 | Anand et al. | |
| 2008/0183859 A1 | 7/2008 | Aaron | |
| 2008/0189156 A1 | 8/2008 | Voda et al. | |
| 2008/0197192 A1 | 8/2008 | Lindahl et al. | |
| 2008/0262928 A1 | 10/2008 | Michaelis | |
| 2008/0288452 A1 | 11/2008 | Sadri et al. | |
| 2008/0300970 A1 | 12/2008 | Scheibe | |
| 2009/0024700 A1 | 1/2009 | Garg et al. | |
| 2009/0024718 A1 | 1/2009 | Anagnostopoulos et al. | |
| 2009/0063630 A1 | 3/2009 | Obasanjo et al. | |
| 2009/0150211 A1 | 6/2009 | Bayne | |
| 2009/0182637 A1 | 7/2009 | Roberts | |
| 2009/0265230 A1 | 10/2009 | Plachouras et al. | |
| 2009/0287596 A1 | 11/2009 | Torrenegra | |
| 2009/0299820 A1 | 12/2009 | Wang et al. | |
| 2009/0313131 A1 | 12/2009 | Giordano | |
| 2010/0010912 A1 | 1/2010 | Jones et al. | |
| 2010/0030592 A1 | 2/2010 | Evans et al. | |
| 2010/0049599 A1 | 2/2010 | Owen et al. | |
| 2010/0057573 A1 | 3/2010 | Singhal | |
| 2010/0121849 A1 | 5/2010 | Goeldi | |
| 2010/0241495 A1 | 9/2010 | Maniyar et al. | |
| 2010/0325107 A1 | 12/2010 | Kenton et al. | |
| 2010/0331016 A1 | 12/2010 | Dutton et al. | |
| 2011/0029511 A1 | 2/2011 | Kodialam et al. | |
| 2011/0035273 A1 | 2/2011 | Parikh et al. | |
| 2011/0040612 A1 | 2/2011 | Simmons et al. | |
| 2011/0071895 A1 | 3/2011 | Masri | |
| 2011/0093331 A1 | 4/2011 | Metzler et al. | |
| 2011/0173072 A1 | 7/2011 | Ross et al. | |
| 2011/0191180 A1 | 8/2011 | Blackhurst et al. | |
| 2011/0208575 A1 | 8/2011 | Bansal et al. | |
| 2011/0213655 A1 | 9/2011 | Henkin et al. | |
| 2011/0246284 A1 | 10/2011 | Chaikin et al. | |
| 2011/0251880 A1 | 10/2011 | Butler et al. | |
| 2011/0276377 A1 | 11/2011 | Kim et al. | |
| 2012/0004968 A1 | 1/2012 | Satyavolu et al. | |
| 2012/0036015 A1 | 2/2012 | Sheikh | |
| 2012/0036017 A1 | 2/2012 | Hasson | |
| 2012/0078694 A1 | 3/2012 | Tavares et al. | |
| 2012/0109749 A1 | 5/2012 | Subramanian et al. | |
| 2012/0128239 A1 | 5/2012 | Goswami et al. | |
| 2012/0158545 A1 | 6/2012 | Chen et al. | |
| 2012/0197711 A1 | 8/2012 | Zhou et al. | |
| 2012/0197726 A1 | 8/2012 | Aggarwal et al. | |
| 2012/0215612 A1 | 8/2012 | Ramer et al. | |
| 2012/0233087 A1 | 9/2012 | Wanker | |
| 2012/0246561 A1 | 9/2012 | Doig et al. | |
| 2012/0253895 A1 | 10/2012 | Bennett et al. | |
| 2012/0259698 A1 | 10/2012 | Yurow | |
| 2012/0290374 A1 | 11/2012 | Tedjamulia et al. | |
| 2012/0290553 A1 | 11/2012 | England et al. | |
| 2012/0303425 A1* | 11/2012 | Katzin | G06Q 20/027 705/14.4 |
| 2012/0303432 A1 | 11/2012 | Hasson | |
| 2012/0323688 A1 | 12/2012 | Mesaros | |
| 2013/0024364 A1* | 1/2013 | Shrivastava | G06Q 20/38 705/39 |
| 2013/0024371 A1* | 1/2013 | Hariramani | G06Q 20/351 705/41 |
| 2013/0030887 A1 | 1/2013 | Calman et al. | |
| 2013/0041737 A1 | 2/2013 | Mishra et al. | |
| 2013/0054371 A1 | 2/2013 | Mason et al. | |
| 2013/0073459 A1* | 3/2013 | Zacarias | G06Q 20/36 705/41 |
| 2013/0085804 A1 | 4/2013 | Leff et al. | |
| 2013/0144785 A1* | 6/2013 | Karpenko | G06Q 20/409 705/44 |
| 2013/0159826 A1 | 6/2013 | Mason et al. | |
| 2013/0204737 A1 | 8/2013 | Agarwal et al. | |
| 2013/0218721 A1* | 8/2013 | Borhan | G06Q 30/0207 705/26.41 |
| 2013/0218765 A1* | 8/2013 | Hammad | G06Q 30/06 705/41 |
| 2013/0317898 A1 | 11/2013 | Kim et al. | |
| 2013/0346302 A1* | 12/2013 | Purves | G06Q 20/102 705/40 |

FOREIGN PATENT DOCUMENTS

| | | |
|---|---|---|
| KR | 10-2011-0057814 | 6/2011 |
| KR | 10-2012-0020915 | 3/2012 |
| WO | 2012037578 A2 | 3/2012 |
| WO | 2013/177090 A1 | 11/2013 |

OTHER PUBLICATIONS

Goldman, M. Office Action issued in co-pending U.S. Appl. No. 11/839,353, filed Aug. 15, 2007, pp. 1-10, Sep. 27, 2010.

Goldman, M. Office Action issued in co-pending U.S. Appl. No. 11/839,353, filed Aug. 15, 2007, pp. 1-11, Jan. 25, 2011.

Kim, S. G. International Search Report and Written Opinion in International Application No. PCT/US2013/041914, pp. 1-11, Aug. 27, 2013.

Brady, "Office Action issued in copending U.S. Appl. No. 13/723,028, filed Dec. 20, 2012", Jun. 24, 2014, 1-37.

Brady, "Office Action issued in copending U.S. Appl. No. 13/723,028, filed Dec. 20, 2012", Oct. 20, 2014, 1-31.

Garcia-Guerra, "Office Action issued in co-pending U.S. Appl. No. 13/471,159, filed May 14, 2012", May 21, 2014, 1-45.

Garcia-Guerra, "Office Action issued in co-pending U.S. Appl. No. 13/471,159, filed May 14, 2012", Jul. 25, 2013, 1-34.

Goldman, "Office Action issued in co-pending U.S. Appl. No. 11/839,353, filed Aug. 15, 2007", Apr. 24, 2014, 1-18.

Johnson, "Office Action issued in copending U.S. Appl. No. 12/059,788, filed Mar. 31, 2008", Jul. 15, 2014, 1-34.

Johnson, "Office Action issued in copending U.S. Appl. No. 12/059,788, filed Mar. 31, 2008", Oct. 23, 2014, 1-34.

Johnson, "Office Action issued in copending U.S. Appl. No. 13/673,906, filed Nov. 9, 2012", Dec. 4, 2014, 1-19.

Mamugo, "Office Action issued in copending U.S. Appl. No. 13/896,269, filed May 16, 2013", Jun. 20, 2014, 1-10.

Mpamugo, "Office Action issued in co-pending U.S. Appl. No. 13/874,359, filed Apr. 30, 2013", Jun. 20, 2014, 1-11.

Sittner, "Office Action issued in co-pending U.S. Appl. No. 13/478,993, filed May 23, 2012", Aug. 8, 2014, 1-31.

(56) References Cited

OTHER PUBLICATIONS

Whitaker, "Office Action issued in copending U.S. Appl. No. 13/490,299, filed Jun. 6, 2012", May 8, 2014, 1-29.
Whitaker, "Office Action issued in copending U.S. Appl. No. 13/490,299, filed Jun. 6, 2012", Aug. 21, 2014, 1-29.
Brady, "Office Action issued in co-pending U.S. Appl. No. 13/723,028, filed Dec. 20, 2012", Feb. 26, 2015, 1-36.
Byrd, "Office Action issued in co-pending U.S. Appl. No. 13/739,258, filed Jan. 11, 2013", Nov. 19, 2014, 1-24.
Jessen, "Office Action issued in co-pending U.S. Appl. No. 13/840,269, filed Mar. 15, 2013", Jan. 14, 2014, 1-10.
Sittner, "Office Action issued in co-pending U.S. Appl. No. 13/478,993, filed May 23, 2012", Feb. 3, 2015, 1-26.
Garcia-Guerra, "Office Action issued in copending U.S. Appl. No. 13/471,159, filed May 14, 2012", May 12, 2015, 1-60.
Jessen, "Office Action issued in copending U.S. Appl. No. 13/840,269, filed Mar. 15, 2013", Aug. 3, 2015, 1-13.
Johnson, "Office Action issued in copending U.S. Appl. No. 12/059,788, filed Mar. 31, 2008", Jun. 29, 2015, 1-48.
Johnsonn, "Office Action issued in copending U.S. Appl. No. 13/673,906, filed Nov. 9, 2012", Jun. 26, 2015, 1-20.
Mpamugo, "Office Action issued in copending U.S. Appl. No. 13/874,3696, filed Apr. 30, 2013", Mar. 10, 2015, 1-18.
Mpamugo, "Office Action issued in copending U.S. Appl. No. 13/874,3696, filed Apr. 30, 2013", Aug. 13, 2015, 1-20.
Mpamugo, "Office Action issued in copending U.S. Appl. No. 13/896,269, filed May 16, 2013", Mar. 10, 2015, 1-13.
Mpamugo, "Office Action issued in copending U.S. Appl. No. 13/896,269, filed May 16, 2013", Aug. 13, 2015, 1-15.
Whitaker, "Office Action issued in copending U.S. Appl. No. 13/490,299, filed Jun. 6, 2012", Jun. 23, 2015, 1-28.
Jessen, "U.S. Office Action issued in copending U.S. Appl. No. 13/840,269, filed Mar. 15, 2013", mailed on Oct. 11, 2016, 13 pages.
Johnson, "U.S. Office Action issued in copending U.S. Appl. No. 13/673,906, filed Nov. 9, 2012", mailed on Sep. 28, 2016, 22 pages.
Mpamugo, "U.S. Office Action issued in copending U.S. Appl. No. 13/896,269, filed May 16, 2013", mailed on Oct. 17, 2016, 16 pages.
Brady, "U.S. Office Action issued in copending U.S. Appl. No. 14/045,234, filed Oct. 3, 2013", mailed on Sep. 9, 2015, 38.
Johnson, "U.S. Office Action issued in copending U.S. Appl. No. 12/059,788, filed Mar. 31, 2008", mailed on Aug. 26, 2010, 20 Pages.
Johnson, "U.S. Office Action issued in copending U.S. Appl. No. 12/059,788, filed Mar. 31, 2008", mailed on Apr. 26, 2011, 28 Pages.
Johnson, "U.S. Office Action issued in copending U.S. Appl. No. 13/673,906, filed Nov. 9, 2012", mailed on Mar. 29, 2016, 18 pages.
Mpamugo, "U.S. Office Action issued in copending U.S. Appl. No. 13/896,269, filed May 16, 2013", mailed on Apr. 7, 2016, 13 pages.
Nakamura, "International Preliminary Report on Patentability issued in International Application No. PCT/US2013/041914", mailed on Dec. 4, 2014, 8 pages.
U.S. Appl. No. 11/839,353 to Mahadevan et al. filed Aug. 15, 2007.
U.S. Appl. No. 13/874,359 to Stuttle et al. filed Apr. 30, 2013.
U.S. Appl. No. 13/723,028 to Eblen et al. filed Oct. 3, 2013.
U.S. Appl. No. 13/723,028 to Eblen et al. filed Dec. 20, 2012.
Mpamugo, "U.S. Office Action issued in copending U.S. Appl. No. 13/896,269, dated May 16, 2013", dated Jun. 1, 2017, 17 pages.
Jessen, "U.S. Office Action issued in copending U.S. Appl. No. 13/840,269, dated Mar. 15, 2013", dated May 23, 2017, 17 pages.
U.S. Appl. No. 13/739,258 to Huebner et al. dated Jan. 11, 2013.

* cited by examiner

INTERACTIVE MANAGEMENT OF DISTRIBUTED OBJECTS

TECHNICAL FIELD

The present disclosure relates generally to management of distributed objects, and more particularly to methods and systems that enable distributed objects, such as offers, to be associated with one or more user-specified digital containers.

BACKGROUND

Merchants and other entities frequently create and distribute digital objects, such as online offers, promotions, or other digital items. Users that receive an offer, for example, often save the offer for redemption at a later time. Users also tend to share popular offers, such as by posting offers on social network pages or texting other users about the offer. The other users can then save the offer, for example, for redemption at a later time.

To save distributed objects such as digital offers, users can either print the offer or digitally "clip" and save the offer in a digital container, such as a digital wallet. For example, the user will open a digital wallet application and then manually associate the offer with the user's digital wallet account. The user can then later access the offer for redemption.

In many instances, however, an object is only compatible with a specific digital container or may not be compatible with any specific digital container. Thus, as objects are widely distributed among a variety of different users—many of which have different digital containers—managing certain objects may be challenging to the user. For example, one user may be able to save an object to a specific container, whereas another user may be unable to save the same object to a different digital container.

SUMMARY

In certain example aspects described herein, a computer-implemented method for management of distributed objects is provided. After an object provider creates an object and associates container-specific handlers with the object, an object management application receives the object. An object distributor, for example, distributes the object across a network, while the object remains associated with a plurality of handlers. Each of the plurality of handlers corresponds to a respective one of plurality of containers. After receiving the object, the object management application provides a first option control for a user to associate the object with any of the plurality of containers. Based on the user selection of the first option control, the object management application receives the selection of the first option control to associate the object with any of the containers. Because the handlers correspond to a respective one of the plurality of containers, the object management application then determines the handlers that are associated with the object to determine a set of available containers for associating the object.

Based on the determined set of available containers, the object management application provides a second option control for the user to select one or more of the set of available containers for associating the object. The second option control identifies the set of available containers for associating the object. The object management application then receives a selection of the second option control, which identifies at least one specific container of the set of available containers for associating the object. In response to receiving the selection of the second option control, the object management application communicates the object to the specific container for associating the object. The container then associates the object with the specific container.

In certain other example aspects, a system for management of distributed objects is provided herein. Also provided in certain aspects is a computer program product for management of distributed objects.

These and other aspects, objects, features and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
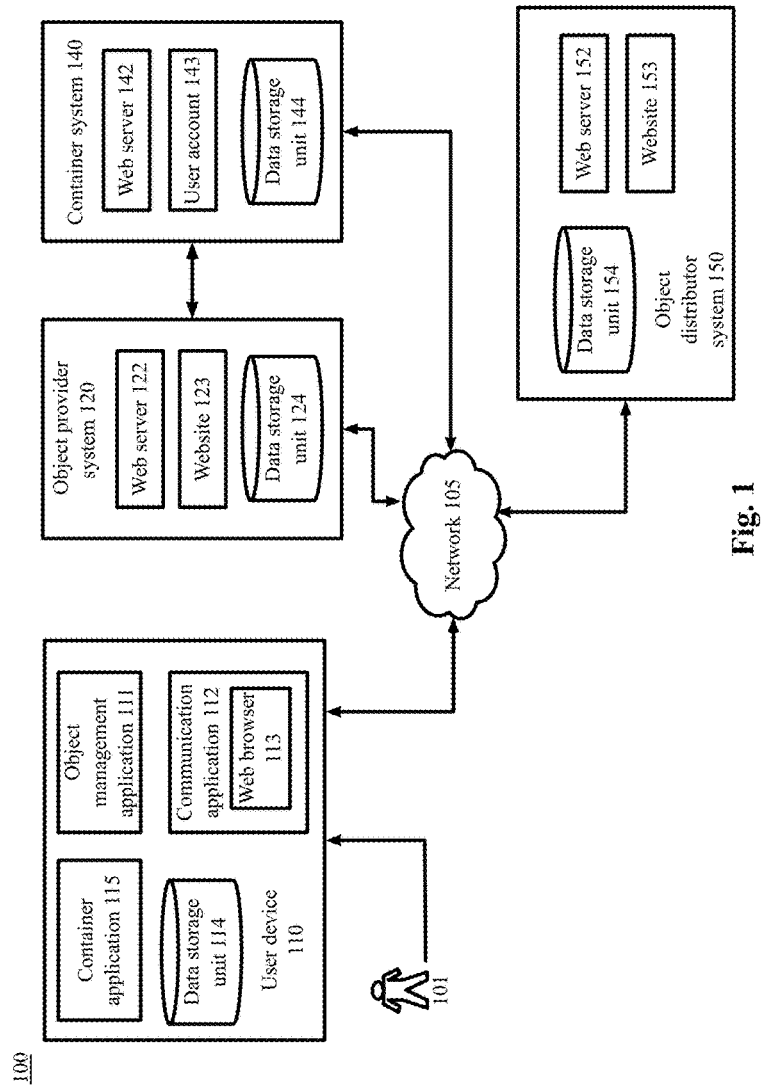
FIG. 1 is a block diagram depicting a system for managing distributed objects, in accordance with certain example embodiments.

As disclosed herein, an object management application manages objects, such as offers, promotions, tickets, events, or other items, that are distributed over a network. An object provider, such as an offer provider, establishes the content of the object and associates one or more handlers with object. Each handler, for example, operates as a container-specific interface specification that allows the object to be associated with a specified digital container, such as specified digital wallet or calendar of a user.

The object provider distributes the object with the associated handlers so that the object remains associated with the handlers. For example, the object can be distributed among social network websites, and users of the social network websites can further distribute the object without disrupting the integrity of the object-handler association. For example, the users may further distribute the object by emailing the object to another person.

The object management application receives and displays the object on a user computing device, along with a user control option to associate the object to a container. When the user selects the option, such as a "save now" option, the object management application relies on the associated container-specific handlers to determine which containers are available to receive and save the object. The object management application provides the user with a second control option from which the user can select one or more of the available containers with which to associate the object. Based on the user's selection, the object management application communicates the object to the selected containers, such as for storage in the container.

More particularly, the object management application receives and displays compatible objects. That is, the object management application receives an object from an object provider. The object provider, for example, establishes the content of the object, which can comprise any digital content provided to a user. For example, the object content can comprise an offer, digital ticket stub, calendar event, or a sales confirmation message that a user may desire to use or otherwise associate with a container. When the object is an offer, for example, the object content may comprise terms of the offers, such as conditions and restrictions associated with the offer. For example, the content may comprise validity dates of the offer.

To be a compatible object, the object comprises one or more container-specific handlers that the object provider associates with the object before distributing the object. For example, a specific digital container provider, such as a specific digital wallet provider, establishes a handler that is unique to the specific container provider. The container-specific handler operates as an interface specification, such as an application-programming interface, that allows objects to be received by and associated with the specific container. The container provider communicates the container-specific handler to the object provider, and the object provider associates the handler with the object. For example, the container-specific handler may be included as meta-data accompanying the content of the object, so that the handler remains associated with the offer.

In certain examples, the object provider associates multiple container-specific handlers with the object. For example, two digital wallet providers may communicate their own, separate container-specific handler to the object provider so that the object provider can associate both of the handlers with the object before distributing the object. In certain examples, the object provider also associates an object identifier with objects to be distributed, such as an identification number that is unique to the object to be distributed. For example, the object provider includes an object identification number in the metadata associated with the object so that the object can be identified.

Once the object provider establishes the content of the object and associates one or more handlers with the object, the object provider distributes the object along with the associated handlers. For example, the object provider distributes the object by communicating the object to one or more users via email distribution. Additionally or alternatively, the object provider can communicate the object to an object distributor, such as a website that posts or provides objects for user consumption. For example, the object provider may communicate the object to a social network website that publishes the object. Users of the social network can then share the object with other users on the social network website or otherwise further distribute the object. In another example, the object provider may communicate the object to an advertising system that presents advertisements or other objects on web pages accessed by a user.

In certain examples, the object management application receives the object when the object provider initially distributes the compatible object online, such as through a website, via email or text messages, or via a dedicated application. Additionally or alternatively, the object management application receives the compatible object indirectly after the object has been further distributed. For example, the object management application may receive the compatible object after users have shared the object via a social network or after users further distribute the object via email or text messaging. Upon receipt of the object, the object management application displays the content of the object. For example, the object management application can display the content of an offer to a user on a social network page. If a user received the object via email, the object management application can display the object content on the user interface of the email service.

In addition to displaying the object content, the object management application associates the content of the object with an option control for users to associate the object to a digital container. That is, the object management application displays an option for associating the object along with the object content in a digital container of the user. For example, the object management application may provide users with a selectable control button—along with the object content—that informs users of an option to store the object in a digital container. The object management application may provide an interactive user control button indicating a "save now," "store now," "save offer," "get offer," or "save to digital wallet" option for users to select on the user interface of the user computing device. When a particular user selects the user control button, such as by clicking on or otherwise invoking the user control button, the object management application receives the user's input selection. Thus, the object management application receives the user's selection of the option to associate the object with one or more specific containers associated with the user.

Based on the user's selection of the option to associate the object with a container, the object management application provides the user with digital containers that are available to receive the object. For example, after a particular user selects a "save to digital wallet" control button, the object management application determines what handlers are associated with the object. The object management application matches each container-specific handler associated with the compatible object to the container to which the handler corresponds. The object management application then provides the user with a list of available digital containers for receiving and associating the object. If the object is associated with only one container-specific handler, the object management application displays the single container associated with the container-specific handler. If the object is associated with multiple handlers, the object can, for example, display all of the available containers corresponding to each container-specific handler.

In certain examples, to display the available containers the object management application provides a second, selectable option control to the user. The second option control, for example, informs the user of the available containers for storing the object. The second option control also allows the user to select the one or more available containers for storing the object. For example, the object management application may provide a user control button on the user interface of the user's computing device that comprises a drop-down menu of available containers. Based on options presented in the drop-down menu, the user can select one or more available containers for storing the object. When the user makes a selection, such as by clicking on or otherwise invoking the options presented on the user control button, the object management application receives the user's input selection. That is, the object management application receives the user's selection of one or more containers for receiving and storing the object.

Once the object management application receives the user's selection of one or more containers, the object management application communicates the object to the selected container. That is, the object management application transmits the object, which includes the associated container-specific handler, to the selected container. The container-specific handler, for example, allows the corresponding specific container to receive the object and associate the object with the container. The container receives the object and associated container-specific handler, and then associates the object with the container on behalf of the user. For example, when a user selects a "save now" button, the container stores the object in response to receiving the object and handler from the object management application. In certain examples, the container notifies the object management application that the container successfully received the object and associated the object with the container. Additionally or alternatively, the container provider notifies the user that the container associated the object with the user's container account.

In certain examples, the object management application communicates identification information about the user to the container. That is, the object management application may, in response to receiving the user's selection of a container, obtain information from the user that the container can use to identify the user's specific container account for storing the object. For example, the object management application may request and receive a user's digital wallet account number from the user, so that the object management application can provide the account number to the digital wallet container. The digital wallet can then, based on receiving the user's account number, associate the object with the user's specific digital wallet account. For example, the digital wallet can save the object information in a record associated with the user's digital wallet account.

Additionally or alternatively, the object management application receives other information from the user, such as the user's name, email address, or other identifying information, that allows the container to identify the user's specific container account for storing the object. For example, the object management application may present fields on the user interface that allow the user to provide name, digital wallet account information, or other information to identify the user's digital wallet account. In certain examples, the object management application or the container receiving the object may provide a pop-up window, for example, where the user can securely enter user identification and authorization information.

In additional examples, the object management application manages repeat objects that the user receives. That is, because of the ability to widely distribute objects while maintaining the integrity of the object-handler associations, a user may receive the same object multiple times (and from different sources). For example, a user may receive the compatible object on various social network pages and also receive the same object by email. To prevent the user from inadvertently attempting to re-save the same object, for example—or to inform the user that the object has already been saved—the object management application in certain examples manages repeat occurrences of the compatible object.

To manage repeat occurrences of the object, the object management application, for example, establishes a record of the user. That is, after receiving the user's selection to associate the object with a container as described herein, the object management application associates the object with the particular user in a record for the user. To establish the record, for example, the object management application may receive identifying credentials for the user. For example, a user may be logged in to a particular search engine, social network, or other website when the user selects an option to save the object to a container, and the object management application may, at the option of the user, obtain user identification from the user credentials. Using the credentials of the user, for example, the object management application associates the user-selected object with the user in a record for the user. Additionally or alternatively, the object management application establishes a record for the user by identifying device-specific cookies located on the user computing device. Additionally or alternatively, the object management application determines the Internet protocol address (IP address) for the user computing device and stores the IP address along with information identifying the object.

To identify the object, the object management application reads the object. That is, the object management application scans the object for specific information regarding the object. For example, by reading the object, the object management application determines any object identification number that the object provider may have associated with the object. Additionally or alternatively, the object management application may determine specific information that is unique to the content of the object that the object management application can later use to identify the object. For example, the object management application may determine the merchant associated an offer and the validity dates of the offer.

After reading the object, the object management application associates the object with the record of the object. That is, the object management application stores the object identification information in the user record as an indication that the user has previously associated the object with the container. As the user receives additional objects, the object management application determines the identity of the objects and compares the objects against the user record of associated objects. If the object management application determines that a user has already saved the object, the object management application informs the user of the saved status of the object. For example, the object management application may present a grayed out, inaccessible first option control button to the user instead of the selectable "save now" or "store now" buttons described herein. In other examples, the user may select a "save now" button. But rather than providing a second control option to the user to save the object to one or more containers, the object management application display a message to the user indicating that the user previously saved the object.

Because the integrity of the object-handler association can be maintained throughout the life of the object, for example, the methods and systems described herein permit universal object distribution among numerous users while retaining the ability of each user to associate the object in a variety of available containers. The methods and systems described herein further enable a user to communicate a specific object to a variety of different containers for storage, without, for example, requiring the user to manually retrieve the object and then manually input the object into a container of the user. That is, relying on the object management application as described herein, users that receive a compatible object can direct the object management application to associate the object on the user's behalf with one or more available containers. The object management application, for example, removes the need for the user to open a website of the container, enter information about the object, and manually associate the object with the container.

Example System Architectures

Turning now to the drawings, in which like numerals indicate like (but not necessarily identical) elements throughout the figures, example embodiments are described in detail.

FIG. 1 is a block diagram depicting a system for managing distributed objects, in accordance with certain example embodiments.

As depicted in FIG. 1, the exemplary operating environment 100 includes a user network computing device 110, an object provider computing system 120, a container computing system 140, and an object distributor computing system 150.

Each network 105 includes a wired or wireless telecommunication means by which network devices (including devices 110, 120, 140, and 150) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment. In some embodiments, a user 101 associated with a device must install an application and/or make a feature selection to obtain the benefits of the techniques described herein.

Each network device 110, 120, 140, and 150 includes a device having a communication module capable of transmitting and receiving data over the network 105. For example, each network device 110, 120, 140, and 150 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 120, 140, and 150 are operated by end-users or consumers, merchant system operators, object provider system operators, container system operators, and object distrobutor system operators, respectively.

The user 101 can use the communication application 112, such as a web browser application or a stand-alone application, to view, download, upload, or otherwise access documents or web pages via a distributed network 105. The network 105 includes a wired or wireless telecommunication system or device by which network devices (including devices 110, 120, 140, and 150) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, near field communication (NFC), or any combination thereof or any other appropriate architecture or system that facilitates the communication of signals, data, and/or messages.

The communication application 112 can interact with web servers or other computing devices connected to the network 105. For example, the communication application 112 can interact with the user network computing device 110, the object provider system 120, the container system 140, and the object distributor system 150. The communication application 112 may also comprise a web browser 113, which provides a user interface, for example, for accessing other devices associated with the network 105.

The user device 110 further comprises an object management application 111 that is configured to communicate and share data with other computing devices connected to the network 105, such as the object provider system 120, the container system 140, and the object distributor system 150. For example, the object management application 111 interacts and shares data with the other network devices via the communication application 112 of the user device 110. The object management application 111 is also configured to receive and recognize objects from the object provider system 120 and/or the object distributor system 150. The object management application 111 may also receive objects from other users 101. The object management application 111 is also configured to communicate objects to the container system 140 and to receive communications from the container system 140. In certain example embodiments, the object management application 111 is configured to communicate and interact with a container application 115. For example, the object management application 111 may communicate objects to and from the container application 115. The object management application 111 is also configured to identify distributed objects, such as those distributed by an object distributor system 150.

In certain example embodiments, the object management functions of the object management application 111 operate and execute fully and completely on the user device 110. Alternatively, the object management functions of the object management application 111 may operate and execute independently from the user device 110. For example, the object management application 111 may operate and execute within a separate computing system, such as an object management system (not shown) or other computing system that manages objects. In such embodiments, the object management system may communicate data to the object management application 111, for example, regarding the management of objects. Alternatively, in other example embodiments the object management functions of the object management application 111 may execute partially on the user device 110 and/or partially on an object management system (not shown) such the object management functions are performed by both the object management application 111 and an object management system.

The user device 110 includes a data storage unit 114 that is accessible by the object management application 111 and the container application 115. In example certain embodiments, the data storage unit 114 receives and stores objects from the object management application 111 and/or the container application 115. The exemplary data storage unit 114 can include one or more tangible computer-readable media. The data storage unit 114 can be stored on the user device 110 or can be logically coupled to the user device 110. For example, the data storage unit 114 can include on-board flash memory and/or one or more removable memory cards or removable flash memory.

The object provider system 120 comprises an offer provider server 122 that is configured to communicate and share data with other devices connected to the network 105. For example, server 122 may represent the computer-implemented system that the object provider system 120 employs to create and assemble object content that the object provider system 120 communicates, for example, to the object distributor system 150. The object provider server 122 may create and assemble objects for any source, such as merchant storefronts, online retailers, online merchants, retail outlets, product manufacturers, product marketing systems, ticket providers, or any other entities or systems that may use or rely on digitally distributed objects. The server 122 of the object provider system 120 may also represent the computer-implemented system that the object provider system 120 uses to both receive container-specific handlers from the container system 140 and to associate the handlers with the object content, thus creating a compatible object as described herein. In certain example embodiments, the server 122 may also represent the computer-implemented system that the object provider system 120 uses to host a website 123 of the object provider system 120. For example, users 101 may access the website 123 of the object provider system 120 to obtain compatible objects, which, as described herein, the user 101 may further distribute.

The object provider system 120 can also communicate and share data with the devices of the network 105 via any available technologies. These technologies may comprise an Internet connection via the network 105, email, text, instant messaging, or other suitable communication technologies. The object provider system 120 can also, for example, communicate with merchant storefronts, online retailers, online merchants, or any other entities or systems that are associated with the object provider system 120. The object provider system 120 may comprise a data storage unit 124 accessible by the object provider server 122 of the object provider system 120. The data storage unit 124 may store object content, handlers, and compatible objects created and/or assembled by the object provider system 120, for example. The data storage unit 124 can include one or more tangible computer-readable storage devices. The data storage unit 124 can be stored on the object provider system 120 or logically coupled to the object provider system 120. For example, the data storage unit 124 can include on-board flash memory and/or one or more removable memory cards or removable flash memory.

The container system 140 represents any system that a compatible object can be associated with. That is, the container system 140 represents any system that can receive a compatible object and then, for example, complete an action regarding the object. For example, the action may comprise storing an object with the container and/or sending a communication to a user 101 in response to receiving the object. A container system 140 may, for example, confirm the shipping status of a shipment to the user 101.

The container system 140 comprises a web server 142, which may represent the computer-implemented system that the container system 140 uses to maintain a digital record of the user 101 such as a user account 143. The web server 142 may also represent the computer-implemented system that container system 140 employs to establish and assemble handlers that are specific to the container system 140. The container system 140 may then communicate the handler, either directly or indirectly via the network 105, to the object provider system 120 for association with object content as described herein. In certain example embodiments, the user account 143 may comprise a digital wallet account of the user 101 where the user 101 may associate offers or other objects relevant to purchase transactions of the user 101. In certain example embodiments, the container system 140 may execute and operate within the container application 115 of the user device 110, or it may execute and operate as a companion application to the container application 115 of the user device 110. Alternatively, the container system 140 may execute and operate independently of the container application 115 of the user device 110.

The container system 140 is configured to communicate handlers to the object provider. For example, the container system 140 may provide handlers directly to the object provider system 120 or communicate handlers to the object provider system 120 via the network 105. The container system 140 is also configured to receive and associate compatible objects from the object management application 111 via the network. The container system 140 can rely on any available technologies to communicate and share data with the devices of the network 105, such as via an Internet connection over the network 105, email, text, instant messaging, or other suitable communication technologies. The container system 140 also comprises an accessible data storage unit 144, which can include an on-board flash memory and/or one or more removable memory cards or removable flash memory. For example, the container system 140 may employ the data storage unit 144 to associate compatible objects, such as storing compatible objects or taking any other action associated with the object.

The object distributor system 150 represents any entity or system that facilitates the distribution of compatible objects. For example, the object distributor system 150 may comprise a social network website where compatible objects are posted and shared. The object distributor system 150 comprises a web server 152 and associated website 153. The web server 152 of the offer distributor system 150 may represent the computer-implemented system that the object distributor system 150 uses to receive objects from the object provider system 120. The web server 152 and associated website of the offer distributor system 150 may also represent the computer-implemented system that the object distributor system 150 uses to distribute compatible objects, such as by posting the object on the website 153.

The object distributor system 150 can rely on any available technologies to communicate and share objects with the devices of the network 105. For example, the object distributor system 150 can distribute objects via an Internet connection over the network 105, email, text, instant messaging, or other suitable communication technologies. The object distributor system 150 also comprises an accessible data storage unit 154, which can include an on-board flash memory and/or one or more removable memory cards or removable flash memory. For example, the object distributor system 150 may employ the data storage unit 154 to store compatible objects for distribution.

It will be appreciated that the network connections shown are exemplary and other means of establishing a communications link between the computers and devices can be used. Moreover, those having ordinary skill in the art having the benefit of the present disclosure will appreciate that the user device 110, the object provider system 120, the container system 140, and object distributor system 150 illustrated in FIG. 1 can have any of several other suitable computer system configurations. For example, a user device 110 can be embodied as a mobile phone or handheld computer may or may not include all the components described above.

Example Processes

The components of the example operating environment 100 are described hereinafter with reference to the example methods illustrated in FIGS. 2-5.

Figure 2:
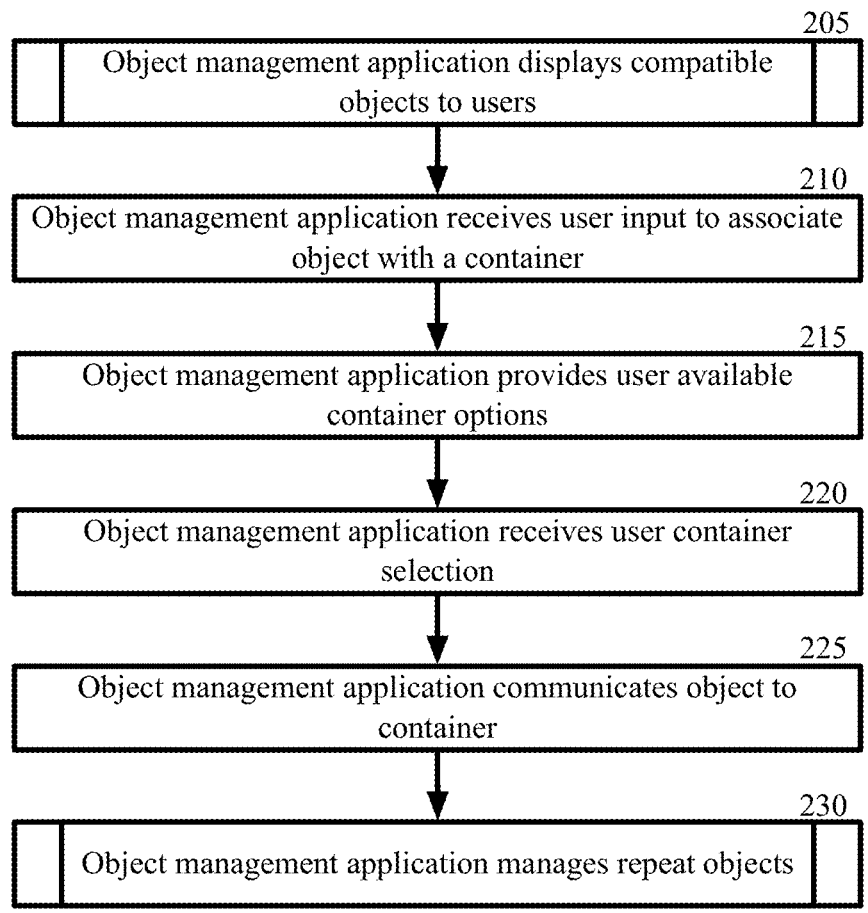
FIG. 2 is a block flow diagram depicting a method for managing objects distributed to users, in accordance with certain example embodiments.

FIG. 2 is a block flow diagram depicting a method for managing objects distributed to users, in accordance with certain example embodiments.

With reference to FIGS. 1 and 2, in block 205, an object management application 111 displays compatible objects to users 101. That is, the object management application 120 receives a compatible object from an object provider system 120. The object provider system 120, for example, establishes the content of the object, which can comprise any digital content provided to a user, such as an offer or other promotion. The object also provider 120 receives container-specific handlers for the object, and associates the handlers with the object to create the compatible object. Each handler corresponds to a particular container system 140 and comprises an interface specification for the container system 140, thus allowing the object to be associated with the particular container system 140. The object provider system 120 distributes the object and associated handlers. The object management application 120 receives the object, and displays the object on a user interface of a user device 110 along with an interactive, user control option for the user to associate the object with a container system 140. For example, the user control option comprises a "save now" or "get offer" button for selecting the object. The details of block 205 are described in further detail below with reference to FIG. 3.

Figure 3:
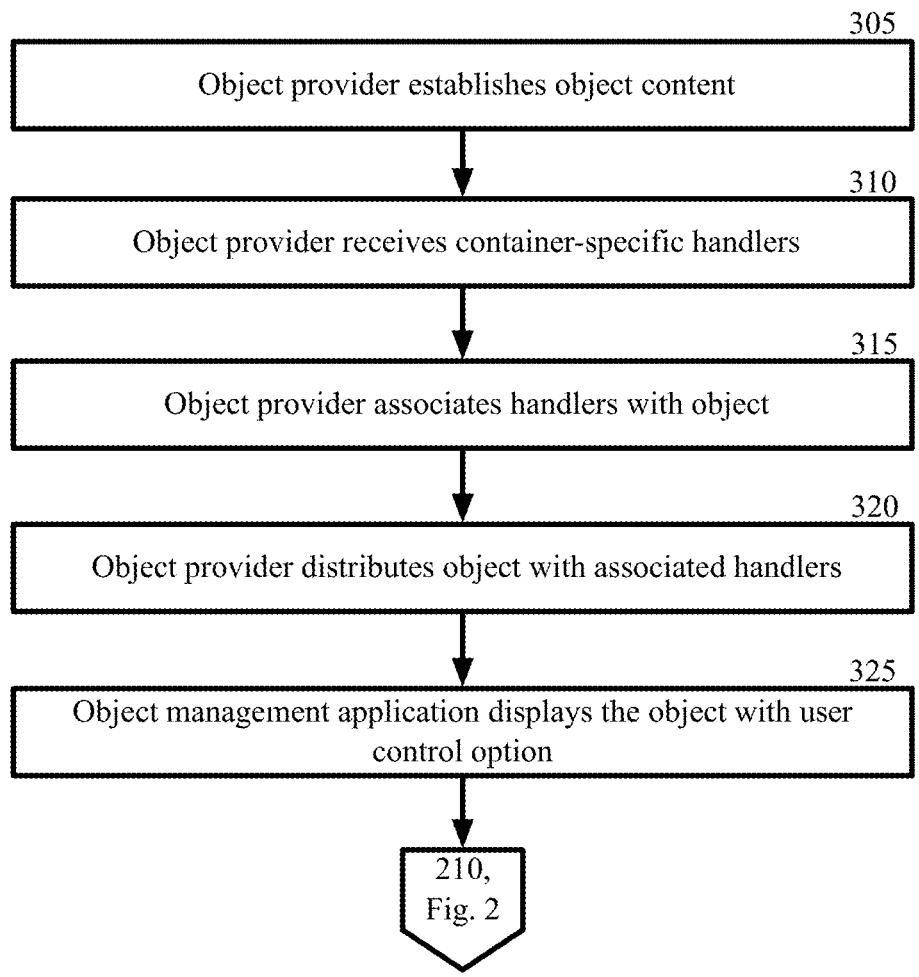
FIG. 3 is a block flow diagram depicting a method for displaying compatible objects to a user, in accordance with certain example embodiments.

FIG. 3 is a block flow diagram depicting a method 205 for displaying compatible objects to a user 101, in accordance with certain example embodiments, as referenced in block 205 of FIG. 2.

With reference to FIGS. 1 and 2, in block 305 of method 205, an object provider system 120 establishes the content of an object. That is, an object provider system 120 creates the subject matter of the object and assembles the object for distribution among several users 101. The object, for example, comprises any digital content that a user 101 may desire to use or otherwise associate with a container system 140. For example, the object may be an offer, digital ticket stub, calendar event or invitation, email, text message, or any other communication that a user 101 receives via the network 105. When the object is an offer, for example, the offer may be a ticket, coupon, discount, rebate, voucher, loyalty reward, special offer, prepaid offer, or any other type of promotion that can be exchanged for a financial discount or rebate when purchasing a product or service, for example. For online retailers or merchants, for example, the offer may be any type of coupon code, promotional or promo code, discount code, key code, reward code, or any other type code exchanged for a financial discount. The content of an offer can include details about the offer, such as conditions, restrictions, and limitations of the offer. The content may also describe the offer, such as "20% off coffee" at the merchants' storefronts.

In block 310, the object provider system 120 receives container-specific handlers. That is, because different containers 140 typically require different programming interfaces to transmit and receive data over the network 105, each container system 140 establishes a handler that is unique to the container system 140. In other words, a hander for one container system 140 is usually not compatible with another container system 140. After establishing a handler, the container system 140 communicates the handler to the object provider system 120, such as over the network, and the object provider system 120 receives the handler for the specific container.

The container-specific handlers operate as interface specifications that allow objects to be received by—and associated with—specific containers and their respective handlers. For example, the interface specification allows a specific container to receive artwork, logos, marks, designs, emblems, symbols, labels, or any other such data associated with the object. In certain example embodiments, the interface specification also allows the container system 140 to communicate information to the object management application 111. For example, the interface specification may allow the container system 140 to inform the object management application 111 that the container has successfully associated an object to the container system 140 on behalf of a user 101. The interface specification may allow the container system 140 to communicate error messages to the object management application 111, such as if the container system 140 is unable to locate a user account 143 for associating the object.

In certain example embodiments, the interface specification comprises a customized application programming interface ("API") for the container system 140. For example, the application programming interface facilitates interactions between the object and the container system 140. The application programming interface can, for example, provide rules, commands, and standards that allow the container system 140 to receive the object and associate the object with the container system 140. The application programming interface mal also allow the container system 140 to communicate messages to the object management application 111, such as messages information the object management application 111 of successful or unsuccessful object association with the container system 140.

In block 315, the object provider system 120 associates the handlers with the object. That is, after the object provider system 120 receives one or more handlers, the object provider system 120 links or joins each handler with the object so that each handler accompanies the object and can hence be distributed with the object. For example, each container-specific handler that the object provider system 120 receives may be included as meta-data accompanying the content of the object. As part of the object metadata, each handler remains associated with the object as the object is distributed. In certain embodiments, the object provider system 120 may associate a single handler with the object. In other example embodiments, the object provider system 120 associates a plurality of different container-specific handlers with the object so that the object is distributed with multiple handlers. Once the offer provider 140 associates the object with a handler, the object becomes a compatible object. As a compatible object, the object management application 111 can determine—based on the one or more associated handlers—which containers are available for associating the object.

In block 320, the object provider system 120 distributes the object with the associated handlers. That is, after associating the handers with the object, the object provider system 120 communicates the compatible object to one or more users via any suitable means. Any entity, such as a user 101, that receives the object can then further distribute the object. For example, the object provider system 120 distributes the object by communicating the object to one or more users 101 via email distribution. The users 101 may then share the object by email or text messaging with other users 10, or the users 101 may share the object with friends on a social network website.

Additionally or alternatively, the object provider system 120 may communicate the object to an object distributor 150, such as a website 153 that posts or provides objects for user consumption. For example, the object provider system 120 may communicate the object to a social network website that publishes the object. The users 101 of the social network can then share the object with other users 101 on the social network website or otherwise further distribute the object. Additionally or alternatively, the object distributor 150 may be an advertising system that presents advertising objects or other objects on web pages accessed by a user 101. Additionally or alternatively, the object provider system 120 may post objects on a website 123 of the object provider system. A user 101, for example, can then access the website and to obtain a compatible object, which the user 101 can then in certain embodiments further distribute.

In block 325, the object management application 111 displays the object with a user input option. That is, based on the distribution of the compatible object, the object management application 111 receives the object and provides the object to users 101 along with the option to associate the object. In certain example embodiments, the object management application 111 receives the object when the object provider initially distributes the compatible object, such as through a website, via email or text messages, or via a dedicated application. For example, the object management application 111 may receive the object when the object is posted on the website of an object distributor 150. Additionally or alternatively, the object management application 111 receives the object indirectly after the object has been further distributed. For example, the object management application 111 may receive the compatible object after users 101 have shared the object via a social network or after users further distribute the object via email or text messaging.

After receiving the object, the object management application 111 associates a selectable user control option with the object. As described herein, the user control option may comprise any action associated with the object and available containers 140, such as a "store now," "save now," of "get offer" action for object. The object management application 111 then provides the content of the object—along with the associated user control option—on the user interface of the user device 110. For example, the object management application 111 provides the content of an offer to a user 101 on website of an offer distributor 150 such as a social network page. If a user 101 received the object via email, the object management application 111 provides the object content and associated user control option on the user interface of the email service provider. By proving the user control option to the user 101 on the user interface of the user device 110, the object management application 111 provides the user 101 with an option to have the object associated with an available container system 140 as described herein. The user 101 may then select the option, thus indicating a desire to associate the object with a container.

Returning to FIG. 2, in block 210 of FIG. 2, the object management application 111 receives a user input to associate a compatible object with a container system 140. That is, based on the user control option that the object management application 111 displays with the object, the user 101 inputs a selection on the user interface on the user device 110. For example, the user clicks, taps, or otherwise chooses the "save now" or "get offer" button that the object management application 111 presents on the user interface of the user device 110. The object management application 111 then receives the user input selection, which operates to confirm the user's intention to associate the object with a container system 140.

The user control option may comprise any information about actions associated with the object and available containers 140. For example, the action may be to "save" or "store" the object in a particular container system 140 as described herein. In other example embodiments, the action may be a "buy" or "buy now" action, such that selection of the option associates the object with a container system 140 for purchasing a particular product or service. In another example embodiment, the action may be a "file now" action, thus allowing the user 101 to associate the object, such as a ticket stub or receipt, in an available container system 140 for filing ticket stubs or receipts. In another example embodiment, the action may be a "retrieve shipping status" action. For example, selecting the "retrieve shipping status" action associates the object with a container system 140 that informs the user of the shipping status of an item. As can be appreciated, the user control option, such as a user control button, may comprise information about any action that a container system 140 may take in response to receiving an object from the object management application 111.

In block 215, the object management application 111 provides the user with available container options for associating the entity. That is, based on the input selection of the user 101, the object management application 111 determines which containers 140 are available to receive the entity. To determine available containers 140, the object management application 111 determines which handlers are associated with the object. In other words, because each handler is associated with a specific container system 140, the handlers permit the object management application 111 to identify which container systems 140 are available. For example, each handler may contain identifying information about the container system 140 to which the handler corresponds, such as a container system 140 identifier.

By reading the container identifier, for example, the object management application 111 identifies the container system 140 corresponding to each handler and hence which containers 140 are available for associating the object. In certain examples, the object may be associated with a single handler and thus may only be associated with one container system 140. In other example embodiments, the object may be associated with a plurality of handlers, and hence may be associated with a set of containers 140. In certain embodiments, the container may reside on the user device 110, such as on the data storage unit 114 of the user device 110. A container application 115, for example, may be responsible for communicating with the object management application 111 on the user device 110, such that objects can be associated with the container of the user device 110. For example, the container application 115 may comprise a digital wallet application of the user 101. In certain other example embodiments, the container application 115 may facilitate communication with the container system, for example.

To provide the available container system 140 selections to the user 101, the object management application 111 presents a second, selectable option control on the user interface of the user device 110. The second option control, for example, informs the user 101 of the containers 140 that are available for associating the object. For example, the second option control may provide the user 101 with a selection of digital wallets available for storing an offer from a merchant. In certain example embodiments, the object management application 111 provides the second option control as a user control button on the user interface of the user device 110. For example, the user control button includes a drop-down menu of available containers 140 and allows the user 101 to select one or more of the available containers 140.

In block 220, the object management application 111 receives the container selection from the user 101. That is, after providing the second option control to the user 101, the user 101 inputs a container selection on the user interface of the user device 110 via the second option control. For example, the user clicks, taps, or otherwise chooses one or more of the available container options, such as those that the object management application 111 presents in a drop-down menu on the user interface of the user device 110. Based on the user's selection of the of the second user control option, the object management application 111 receives the user's second input selection, which operates to confirm the user's identification of a container system 140 for associating the object. Because the user 101 can select an available container system 140 for associating the object, the methods and systems disclosed herein provide a user-interactive means of managing distributed objects.

In block 225, the object management application 111 communicates the object to the container system 140. That is, after the object management application 111 receives a container selection for the object, the object management application 111 transmits the object to the user-selected container system 140 via the network 105. The container system 140 receives the object, along with the one or more handlers that are associated with object. The container-specific handlers, for example, allow the corresponding specific container system 140 to receive the object and associate the object with the container system 140. Thus, based on the handler for the specific container system 140, the specific container system 140 processes the object so that the object becomes associated with the container system 140. For example, the web server 122 of the container system 140 relies on an interface specification of the handler to receive and store the object with a user account 143 associated with the container system 140. If the user control option is a "save offer" option, for example, the container processes the object by storing the offer on behalf of the user 101 in the user account 143 of the container system 140.

In certain example embodiments, the object management application 111 communicates identification information about the user 101 to the container system 140 so that the container system 140 can identify the particular user account 143 for associating the object. For example, a container provider, such as a digital wallet provider, may manage and maintain numerous user accounts 143. Thus, when the object management application 111 communicates an object to a user-selected container system 140, the container system 140 utilizes the user identification information communicated with the object to identify (such as, locate in electronic storage) the user account 143 of the particular user 101. The container system 140 then associates the object with the particular user account 143.

The identification information comprises any information sufficient to identify a particular user account 143. For example, in certain embodiments the user account 143 comprises a digital wallet account of the user. The object management application 111 may thus request and receive the digital wallet account number so that the object management application 111 can provide the account number to the container system 140. The container system 140 can then associate the object in the digital wallet account of the container system 140. Additionally or alternatively, the object management application 111 receives other identification information from the user, such as the user's name, email address, or other identifying information that allows the container system 140 to identify the user's specific user account 143 for associating the object.

In certain example embodiments, the object management application 111 may present fields on the user interface that allow the user 101 to provide the identification information of the user 101. For example, the user 101 may provide the user's name, account information (such as digital wallet account information), or other information to identify the user's account 143. In certain examples, the object management application 111 or the container system 140 receiving the object may provide a pop-up window, for example, where the user 101 can securely enter user identification. In certain example embodiments, the user 101 may also provide an authorization. For example, the pop-up window may require the user 101 to enter a user name and password to verify the addition of the object to the user account 143 of the container system 140.

In certain example embodiments, after the container system 140 has successfully associated the object with the container system 140, the container system 140 notifies the object management application 111 the successful association. For example, the interface specification of the handler allows the container system 140 to communicate a confirmation to the object management application 111 that the object has been associated with the container system 140. The object management application 111 receives the confirmation and, in certain example embodiments, presents the confirmation to the user 101 via the user interface of the user device 110.

Additionally or alternatively, the provider of the container system 140 notifies the user 101 that the container system 140 has associated the object with the user's container account 143. For example, the container system 140 may, based on correspondence information associated with the user account 143, send an email communication to the user 101 confirming that the container system 140 successfully associated the entity with the container system 140. If, for example, the action for the object is a "retrieve shipping status" action, the container system 140 retrieves the shipping status and provides the shipping status to the user, such as by emailing the user. In other embodiments, if the container system 140 is unable to locate a user account 143 for associating the object, the container system 140 may communicate an error message to the object management application 111. The object management application 111 can then notify the user of the error, such as by displaying an error message to the user 101 on the user interface of the user device 110.

In block 230, the object management application 111 manages repeat objects. That is, the object management application 111 determines whether a particular user 101 has previously chosen to associate a distributed object with a container. To manage repeat objects, the object management application 111 establishes a record for the user 101. The object management application 111 then reads the content of the user-selected object and associates the object with the record for the user 101. The object management application 111 then compares any newly received objects against the user record to identify objects that the user 101 has previously associated with a container. In certain example embodiments, the object management application 111 informs the user 101 of the repeat object event.

Figure 4:
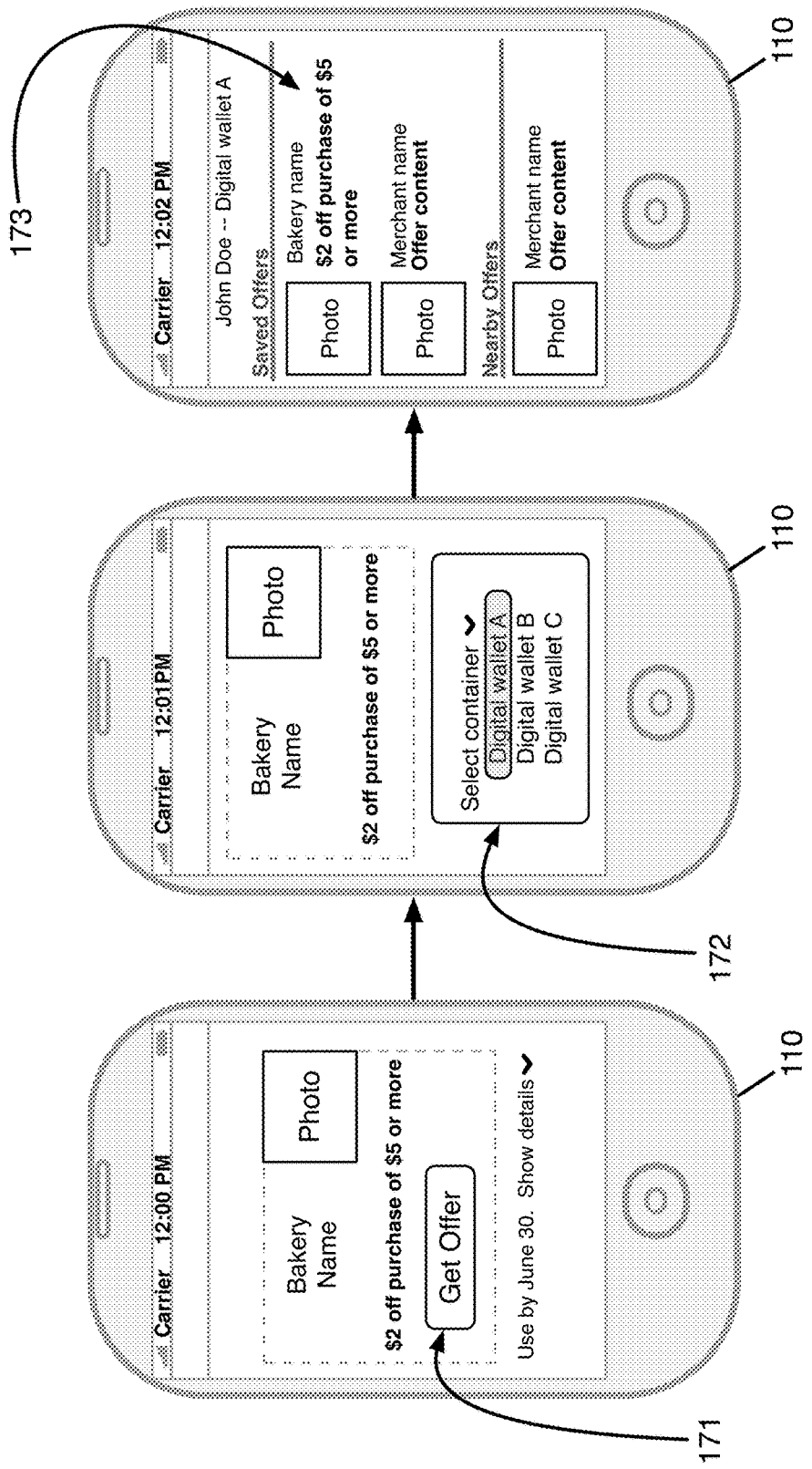
FIG. 4 is an illustration depicting a user interface for managing objects, in accordance with certain example embodiments.

Example details of managing objects are described in further detail with reference to FIG. 4. FIG. 4 is an illustration depicting a user interface for managing objects, in accordance with certain example embodiments. With reference to FIG. 4, the object management application 111 (of FIG. 1) presents an object, such as a discount offer from a bakery, on a user device 110 of a particular user 101 (of FIG. 1). The object management application 111 also associates with the object a user input option, such as a "Get Offer" control button 171. When the user 101 selects the "Get Offer" control button, for example, the object management application 111 provides the user 101 with a selectable set of available containers 172 for associating the offer from the bakery. As described herein, the object management application 111 determines the set of available containers 172 based on the handlers associated with the object. For example, the set of available containers 172 may include various digital wallets. When the user 101 selects a container, such as "Digital wallet A," among the set of available containers 172, the object management application 111 communicates the discount offer from the bakery to Digital wallet A. The container in this example (Digital wallet A) then associates the offer with a record of the particular user 101 via the associated handler. For example, the Digital wallet A saves the offer for later redemption. The associated offer 173 for the bakery is then displayed, for example, in Digital wallet A of the user 101.

Figure 5:
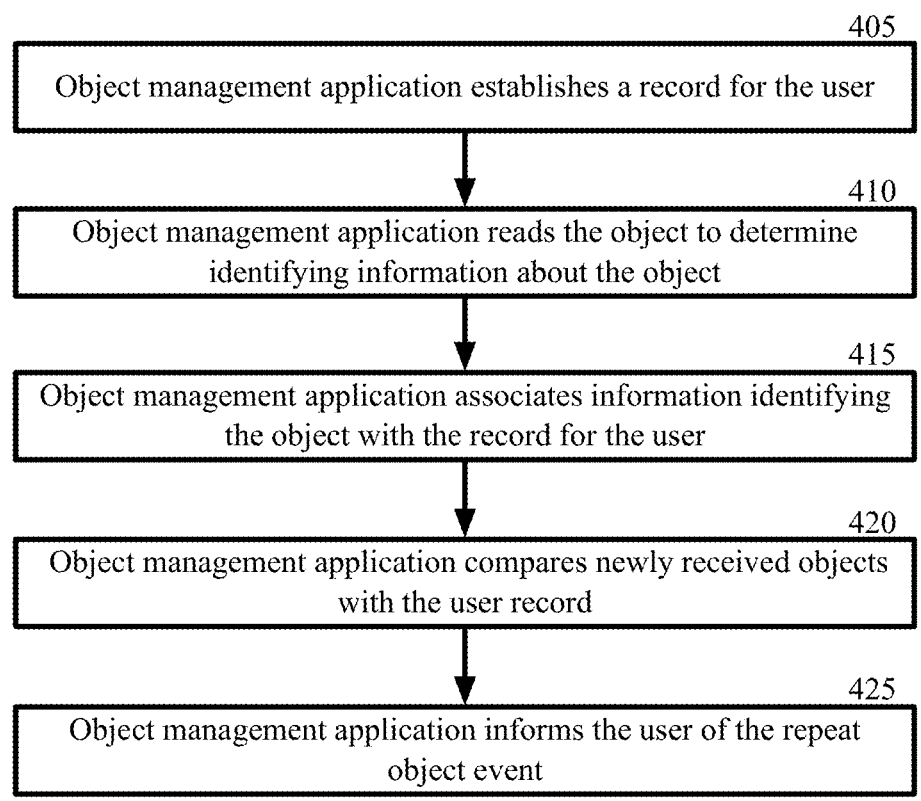
FIG. 5 is a block flow diagram depicting a method for monitoring repeat objects, in accordance with certain example embodiments

FIG. 5 is a block flow diagram depicting a method 230 for monitoring repeat objects, in accordance with certain example embodiments, as referenced in block 230 of FIG. 2.

With reference to FIGS. 1 and 2, in block 405 of method 230, the object management application 111 establishes a record for the user 101. That is, after receiving a user input selection as described with reference to block 210, the object management application 111 determines, at the option of the user, identifying information about the user 101 or the user computing device 110. The object management application 111 then uses the information to create an accessible record, such as an account, for the user 101. For example, the object management application 111 may receive identifying credentials for the user 101 based on the authentication of a user account. For example, a user 101 may log in to a particular search engine, social network website, or other website when the user selects an option to associate an object with a container system 140. Thus, the object management application may, at the option of the user, obtain user identification from the user authentication credentials. Additionally or alternatively, the object management application 111 identifies cookies on the user device 110 that are unique to the user device 110. That is, the cookies allow identification of the user device 110 in certain example embodiments. Additionally or alternatively, the object management application 111 determines the Internet protocol address (IP address) for the user computing device 110. The object management application 111 then stores the IP address, for example, in the data storage unit 114 of the user device 110.

Additionally or alternatively, because in certain example embodiments the user 101 may download and install the object management application 111 on the user device 110, the user 101 may provide the identifying information to create a record of the user 101 when the user 101 installs the object management application 111. In certain example embodiments, such as when the object management application 111 executes on at least partially on the user device 110, the object management application 111 comprises computer programming interface information that allows the object management application 111 to store and receive data in the data storage unit 114 of the user device 110. In such embodiments, the data storage unit 114 on the user device 110 serves as the accessible database record for managing repeat occurrences of the objects. That is, because the data storage unit 114 on the user device 110 operates in association with the user device 110 of a specific user 101, the data storage unit 114 on the user device 110 can also operate as a unique record for the user 101 for managing repeat objects.

In block 410, the object management application 111 reads the object associated with the user input selection to determine identifying information about the object. That is, the object management application 111 scans the object for specific information regarding the object that the object management application 111 can later user to identify the object. For example, when creating an object for distribution, the object provider system 120 may include a unique object identifier within the metadata of object. The identifier may comprise any information or content identifying the object, such as an identification number or code. As the object is distributed among several users, for example, the identifier remains associated with the object. By reading the object, the object management application 111 determines any object identification number that the object provider 120 may have associated with the object. Additionally or alternatively, the object management application 111 may determine other specific information that is unique to the content of the object that the object management application can later use to identify the object. For example, the object management application 111 may determine the merchant associated an offer and the validity dates of the offer.

In block 415, the object management application 111 associates information identifying the object with the record for the user 101. That is, based on the object identification information that the object management application 111 obtains from reading the object, the object management application 111 records or stores the object identification information in the record for the user 101. For example, the object management application 111 stores the object identification information, such as the object identification number, in the data storage unit 114 of the user device 110. The stored object identification information, for example, operates as an indication that the user 101 has previously associated the object with a container system 140.

In block 420, the object management application 111 compares newly received objects against the record of the user 101. That is, as the object management application 111 receives additional objects, the object management application 111 reads each object to determine identifying information for the object as described with reference to block 410. The object management application 111 then determines whether identifying information in the newly received object matches information in the record of the user 101. For example, if the object management application 111 determines that identifying information for the newly received object already exists in the record of the user 101, the object management application 111 determines that the object is a repeat object. That is, the newly received object is an object that the user 101 has previously chosen to associate with a container system 140. If identifying information for the newly received object is not present in the record of the user 101, then the object management application 111 processes the newly received object as described with reference to blocks 210, 215, 220, and 225.

In block 425, the object management application 111 informs the user of the repeat object event. That is, after the object management application 111 identifies a repeat object, the object management application 111 notifies the user 101 of the repeat occurrence. The object management application 111 may notify the user by any suitable means. For example, if the object management application 111 identifies a repeat object, the object management application 111 may present a grayed out, inaccessible first option control button to the user 101 indicating that the object cannot be re-associated with a container.

Additionally or alternatively, the first option control may provide any information to the user 101 indicating the object has already been associated with a container. For example, the object management application 111 may present a user control button informing the user 101 that the object is "already saved" or "in the digital wallet" of the user. In other example embodiments, the user 101 may be able to select the first option control button such as a "save now" or "get offer" button as described herein. But rather than providing a second control option to the user 101 to associate the object to one or more containers, the object management application 111 may display a message to the user 101 indicating that the user previously saved the object. For example, the object management application 111 may provide a pop-up window that informing the user 101 previous association of the object with the container. Upon receipt the notification of the repeat occurrence, the user 101 knows, for example, that the container has already associated the object.

Other Example Embodiments

Figure 6:
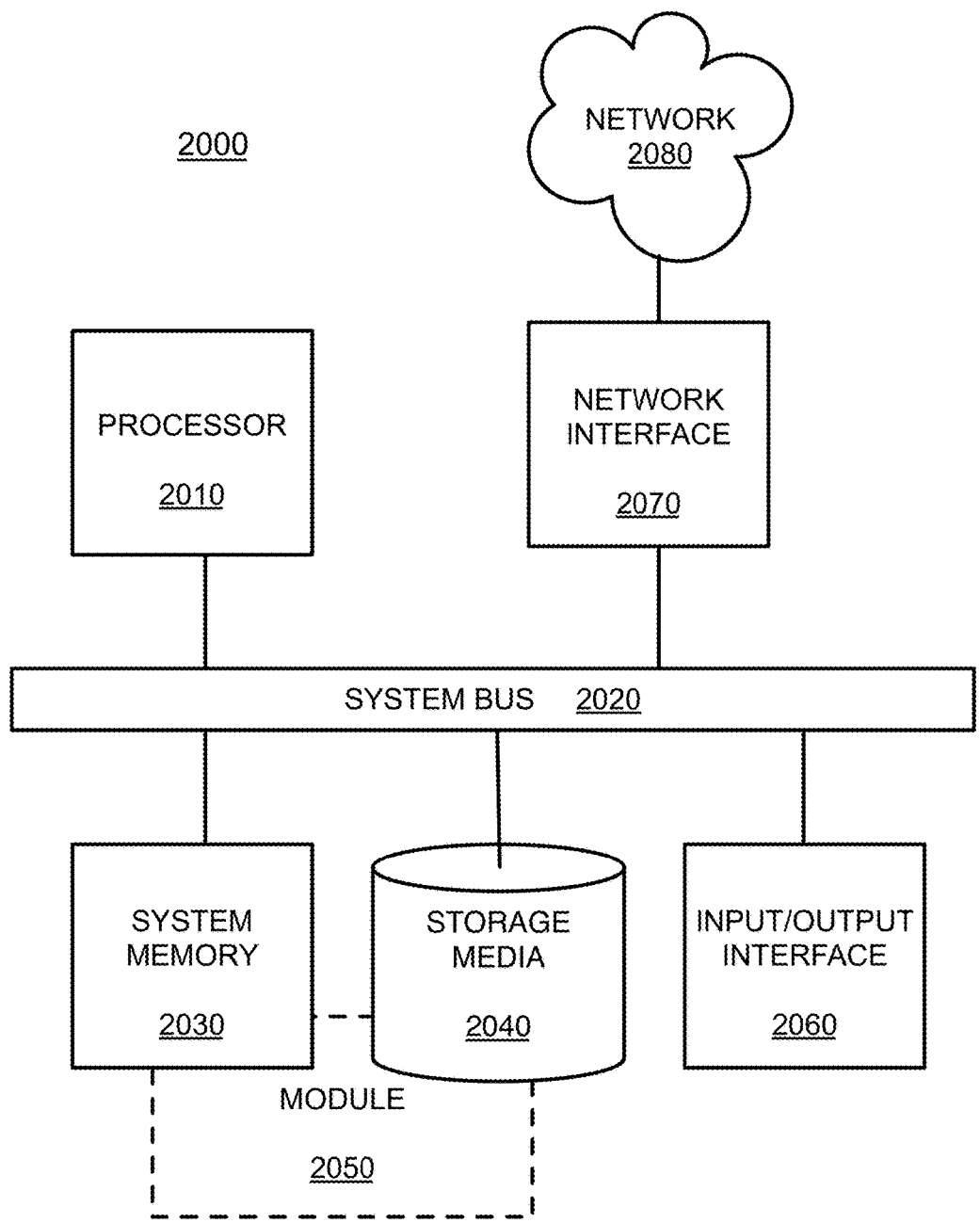
FIG. 6 is a block diagram depicting a computing machine and a module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the examples described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to act on digital data objects, comprising:

receiving, by one or more computing devices, a digital data object, wherein the digital data object comprises a plurality of digital data object handlers that each correspond to a respective one or more of a plurality of digital data object containers;

providing, by the one or more computing devices, a first option control for a user to select an action with respect to the digital data object;

receiving, by the one or more computing devices, a first selection of the first option control;

providing, by the one or more computing devices and in response to receiving the first selection, a second option control for the user to select a specific digital data object container from among the digital data object containers corresponding to the digital data object handlers of the digital data object;

receiving, by the one or more computing devices, a second selection of the second option control, wherein the second selection identifies a specific digital data object container; and performing, by the one or more computing devices and in response to receiving the second selection, the selected action on the digital data object with respect to the specific digital data object container using the digital data object handler corresponding to the specific digital data object container.

2. The computer-implemented method of claim 1, wherein the plurality of digital data object containers comprises a digital wallet.

3. The computer-implemented method of claim 1, wherein the digital data object comprises one of an offer, a ticket, or a calendar event.

4. The computer-implemented method of claim 1, wherein
providing the second option control comprises:
identifying, by the one or more computing devices, the digital data object handlers of the digital data object; and
determining, by the one or more computing devices, the respective digital data object containers to which the identified digital data object handlers correspond.

5. The computer-implemented method of claim 1, wherein the selected action comprises at least one of save the digital data object, purchase a product corresponding to the digital data object, and track a delivery associated with the digital data object.

6. The computer-implemented method of claim 1, wherein performing the selected action comprises communicating, by the one or more computing devices, identifying information of the user to the digital data object container.

7. The computer-implemented method of claim 6, wherein the identifying information of the user permits the digital data object container to identify a digital data object container account of the user.

8. The computer-implemented method of claim 1, further comprising:
associating, by the one or more computing devices, the digital data object with a record of digital data objects of the user;
comparing, by the one or more computing devices, the associated digital data object with a second digital data object of the record;
determining, by the one or more computing devices and in response to the comparison the digital data object associated with the record of the user with a second digital data object, that the associated digital data object is a repeat digital data object; and communicating, by the one or more computing devices, to the user that the associated digital data object is a repeat digital data object of the second digital data object.

9. The computer-implemented method of claim 1, wherein providing the first option control or the second option control comprises displaying, by the one or more computing devices, the first option control or the second option control on a user interface.

10. A system to provide object management, comprising:
a storage device;
a processor communicatively coupled to the storage device, wherein the processor executes application code instructions that are stored in the storage device to cause the system to:
provide a first option control for a user to select an action with respect to a digital data object, the digital data object comprising a plurality of digital data object handlers, each digital data object handler corresponding to one or more data digital object containers;
receive a first selection of the first option control;
provide, in response to receiving the first selection, a second option control for the user to select a specific digital data object container from among the one or more digital data object containers corresponding to the digital data object handlers of the digital data object;
receive a second selection of the second option control, wherein the second selection of the second option control identifies the specific digital data object container; and
perform, in response to receiving the second selection, the selected action on the received digital data object with respect to the specific digital data object container using the digital data object handler corresponding to the specific digital data object container.

11. The system of claim 10, wherein the digital data object comprises one of an offer, a ticket, or a calendar event.

12. The system of claim 10, wherein providing the second option control comprises:
identifying the digital data object handlers of the digital data object; and
determining the respective digital data object containers to which the identified digital data object handlers correspond.

13. The system of claim 10, wherein the selected action comprises at least one of save the digital data object, purchase a product corresponding to the digital data object, and track a delivery associated with the digital data object.

14. The system of claim 10, wherein performing the selected action comprises communicating identifying information of the user to the digital data object container in connection with the digital data object.

15. The system of claim 14, wherein the identifying information of the user permits the digital data object container to identify a digital data object container account of the user.

16. A computer program product, comprising:
a non-transitory computer-readable storage device having computer-readable program instructions embodied thereon that when executed by a computer cause the computer to act on digital data objects, the computer-executable program instructions comprising:
computer program instructions to provide a first option control for a user to select an action with respect to a digital data object, the digital data object comprising a plurality of digital data object handlers, each digital data object handler corresponding to one or more digital data object containers;

computer program instructions to receive a first selection of the first option control;

computer program instructions to provide, in response to receiving the first selection, a second option control for the user to select a specific digital data object container from among the one or more digital data object containers corresponding to the digital data object handlers of the digital data object;

computer program instructions to receive a second selection of the second option control, wherein the second selection of the second option control identifies the specific digital data object container; and computer program instructions to perform, in response to receiving the second selection, the selected action on the received digital data object with respect to the specific digital data object container using the digital data object handler corresponding to the specific digital data object container.

17. The computer program product of claim 16, wherein providing the second option control comprises:
identifying the digital data object handlers of the digital data object; and
determining the respective digital data object containers to which the identified digital data object handlers correspond.

18. The computer program product of claim 16, wherein the selected action comprises at least one of save the digital data object, purchase a product corresponding to the digital data object, and track a delivery associated with the digital data object.

19. The computer program product of claim 16, wherein performing the selected action comprises communicating identifying information of the user to the digital data object container in connection with the digital data object.

20. The computer program product of claim 19, wherein the identifying information of the user permits the digital data object container to identify a digital data object container account of the user.

* * * * *